United States Patent [19]
Back

[11] Patent Number: 5,496,178
[45] Date of Patent: Mar. 5, 1996

[54] TELEVISION RECEIVER HAVING VIDEO ACCOMPANIMENT FUNCTIONS

[75] Inventor: Dong-cherl Back, Suwon, Rep. of Korea

[73] Assignee: Samsung Electronics Co., Ltd., Kyungki-Do, Rep. of Korea

[21] Appl. No.: 183,848

[22] Filed: Jan. 21, 1994

[30] Foreign Application Priority Data

Mar. 8, 1993 [KR] Rep. of Korea ............... 93-3422

[51] Int. Cl.$^6$ ............... G10H 1/36; H04N 5/765
[52] U.S. Cl. ............... 434/307 A; 434/308; 348/725; 455/353
[58] Field of Search ............... 434/118, 307 R, 434/307 A, 308, 309, 318, 362; 348/512, 515, 725; 380/15, 20; 360/33.1; 340/825.2, 825.22, 825.69, 825.72, 825.76; 84/456, 477 R, 601–615, 625, 645; 455/353

[56] References Cited

U.S. PATENT DOCUMENTS

| | | | |
|---|---|---|---|
| 5,157,496 | 10/1992 | Kurosawa | 348/725 X |
| 5,161,187 | 11/1992 | Kajita et al. | 380/15 |
| 5,187,469 | 2/1993 | Evans et al. | 455/353 X |
| 5,194,683 | 3/1993 | Tsumura et al. | 434/307 A |
| 5,247,126 | 9/1993 | Okamura et al. | 434/307 A |
| 5,291,343 | 3/1994 | Goto | 360/33.1 |
| 5,299,006 | 3/1994 | Kim | 348/725 X |
| 5,335,073 | 8/1994 | Yamamoto | 434/307 A |

*Primary Examiner*—Joe Cheng
*Attorney, Agent, or Firm*—Sughrue, Mion, Zinn, Macpeak & Seas

[57] ABSTRACT

A television receiver capable of performing a video accompaniment function includes a television signal generator for receiving a television signal and providing a video signal and an audio signal, a video accompaniment signal generator for reading background/lyrics information and accompaniment information of a program selected tom among a plurality of programs stored in a memory, providing a video signal for accompaniment and an accompaniment signal, and generating a pseudo-sync signal, a first selector for selectively providing the video signal supplied from the television signal generator and the pseudo-sync signal supplied from the video accompaniment signal generator, a second selector for selectively providing the audio signal supplied from the television signal generator and the accompaniment signal supplied from the video accompaniment signal generator, a video output unit for receiving a signal selected from the first selector and the accompaniment video signal as a video output, an audio output unit for receiving a signal selected in the second selector as an audio output, and a controller for controlling respective elements according to the mode selection of television/video accompaniment. The television receiver is incorporated with the video accompaniment apparatus, thereby enhancing usage.

41 Claims, 9 Drawing Sheets

TELEVISION RECEIVER HAVING VIDEO ACCOMPANIMENT FUNCTIONS

BACKGROUND OF THE INVENTION

1. Field of the Invention

The present invention relates to a television receiver and, more specifically, to a television receiver capable of performing a video accompaniment function.

Korean Patent Application No. 93-3422 is incorporated herein by reference for all purposes.

2. Discussion of the Prior Art

A conventional television receiver is provided with an external signal input port for receiving a video signal and/or audio signal from external equipment. Accordingly, the video and audio signals supplied from a video recorder, a camcorder (camera recorder), a video accompaniment apparatus, etc. can be monitored through a cathode ray tube (CRT) and speakers. The user can selectively view a television signal and a video/audio signal input through an external signal input port using a remote control apparatus or by manipulating a button installed on the television receiver itself.

The video accompaniment apparatus is connected to a television receiver or monitor, and is for displaying the lyrics and/or still picture representative of a song while providing a musical accompaniment thereof. Such an apparatus can be classified as a laser disc (LD) video accompaniment system using a laser disc player (LDP), a compact disc (CD) video accompaniment system using a CD graphics player (CDGP), and a computer accompaniment system using a memory.

The LDP-type system is superior to the others in view of the quality of the video and audio output. However, since the contents of one laser disc is limited to approximately thirty programs (songs), a disc changer apparatus (e.g., a juke-box) is required in order to accommodate a larger number of songs. The CDGP-type system provides excellent audio quality. However, since only a limited amount of still picture information can be recorded in a sub-code channel of the CD, relationship between the video and the audio is rough in comparison with the LD. It will be noted that since one CD is limited to about ninety-nine songs, this system also needs a disc changer apparatus.

A computer accompaniment system, on the other hand, cannot provide the same audio quality as in the LDP-type and CDGP-type systems, but can provide accompaniment and lyrics information for about 1,000 to 1,500 songs. It will be noted that the computer accompaniment system can select the programs at high speed.

Figure 1:
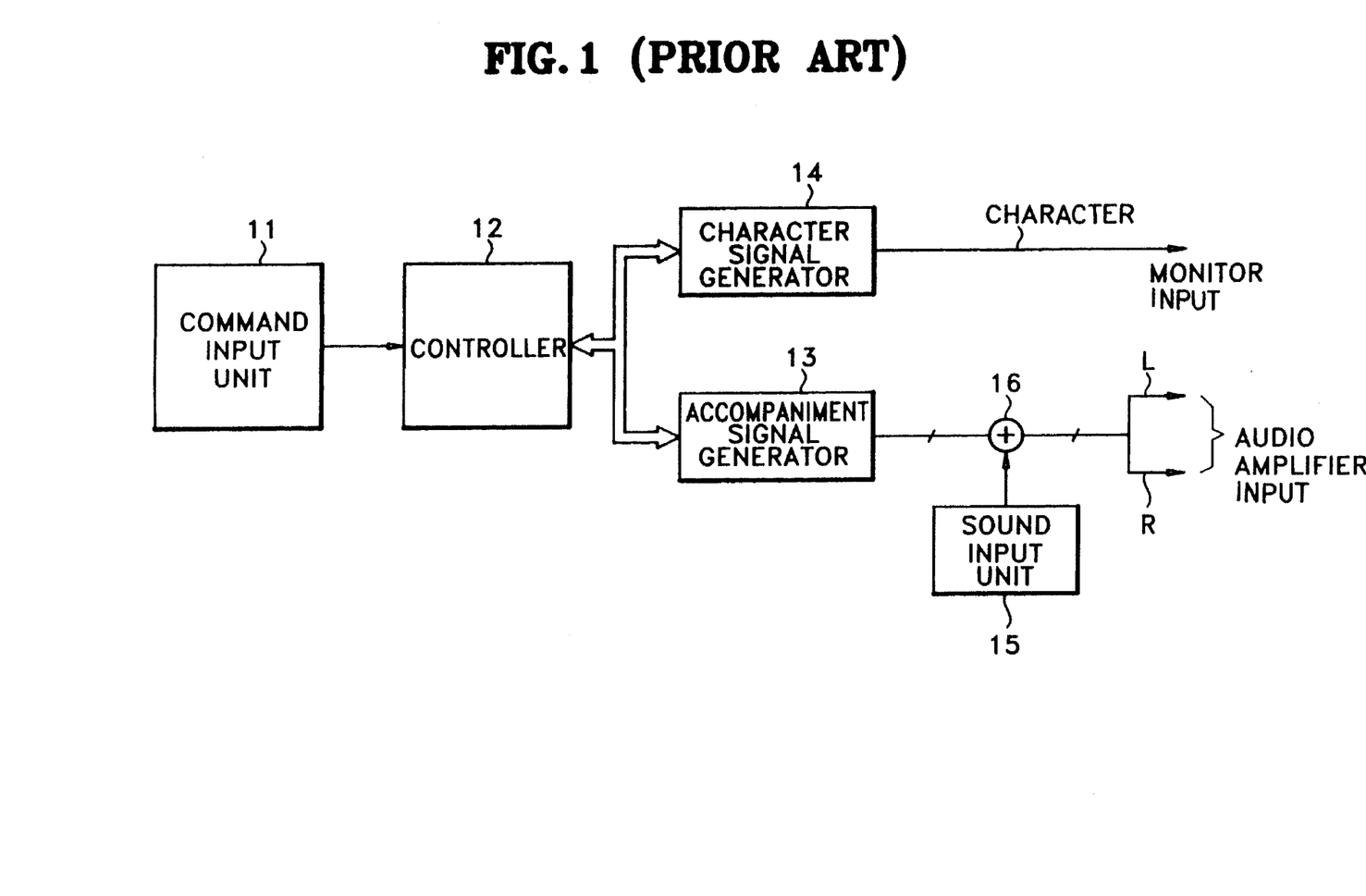
FIG. 1 is a block diagram showing a conventional video accompaniment apparatus.

FIG. 1 shows one example of a computer accompaniment system using a memory. Referring to FIG. 1, the computer accompaniment apparatus provides a stereo accompaniment signal and lyrics information and is connected to a television receiver or an audio amplifier. Here, a reference numeral 11 indicates a command input unit for input of an instruction for controlling system operation, a reference numeral 12 is a controller for controlling system operation according to the input control command from command input unit 11, a reference numeral 13 is an accompaniment signal generator for generating an accompaniment signal, a reference numeral 14 is a character signal generator for generating a lyrics signal, a reference numeral 15 is an audio input unit for input of an audio signal, and a reference numeral 16 is a mixer for mixing the audio signal and accompaniment signal.

Accompaniment signal generator 13 comprises a memory for storing the accompaniment information, and character signal generator 14 comprises another memory for storing the lyrics information.

Operation of the video accompaniment apparatus having the construction of FIG. 1 will be briefly described. If a particular program is selected via command input unit 11 and an accompaniment start command is input, controller 12 controls accompaniment signal generator 13, to thus generate the accompaniment signal of the designated song. At the same time, controller 12 controls character signal generator 14 to generate the corresponding lyrics information. The audio signal input through audio input unit 15 is mixed with the accompaniment signal in mixer 16. The output of mixer 16 is supplied to an audio input terminal of the television receiver or to an audio amplifier, through an audio output terminal. It will be noted that the output of character signal generator 14 is supplied to a video input terminal of the television receiver or to an external monitor, through a video output terminal.

Although such a computer accompaniment apparatus essentially requires a television receiver to monitor the accompaniment signal and the lyrics signal generated therefrom, the accompaniment apparatus is provided separately and independent of the television receiver. Thus, the user must separately purchase and manipulate each component.

It will also be noted that since the video accompaniment apparatus is equipped with the command input unit therein, the user must manipulate the video accompaniment apparatus while, at the same time, the user must separately manipulate the television receiver. Accordingly, the use of the video accompaniment apparatus is operationally inconvenient.

SUMMARY OF THE INVENTION

The present invention was motivated by a desire to overcome the deficiencies present in the prior art. More specifically, the present invention was motivated by the recognition that if the television receiver could be integrated with the video accompaniment apparatus, ease of operation by the user would be enhanced. The present invention was also motivated by the recognition that if an apparatus for remotely controlling the television receiver having the video accompaniment could be provided, convenience to the user would be greatly enhanced.

An object of the present invention is to provide a television receiver having a video accompaniment function.

This and other objects, features and advantages according to the present invention are provided a television receiver including:

- a television signal generator for receiving a television signal and providing a video signal and an audio signal;
- a video accompaniment signal generator for reading background/lyrics information and accompaniment information of a program selected among a plurality of programs stored in a memory, providing a video signal for accompaniment and an accompaniment signal, and generating a pseudo-sync signal;
- a first selector for selectively providing the video signal supplied from the television signal generator and the pseudo-sync signal supplied from the video accompaniment signal generator;
- a second selector for selectively providing the audio signal supplied from the television signal generator and the accompaniment signal supplied from the video accompaniment signal generator;

a video output unit for receiving a signal selected from the first selector and the accompaniment video signal as a video output;

an audio output unit for receiving a signal selected in the second selector as an audio output; and a controller for controlling respective elements according to the mode selection of television/video accompaniment.

Preferably, the television receiver according to the present advantageously includes a remote control apparatus having a mode control key for determining whether the operation of a video accompaniment apparatus has been initiated, a speed control key for determining an accompaniment speed of the video accompaniment apparatus, an interval control key for determining an interval of the video accompaniment apparatus, and a program selection key for determining an accompaniment song of the video accompaniment apparatus.

BRIEF DESCRIPTION OF THE DRAWINGS

The above objects and other advantages of the present invention will become more apparent by describing in detail a preferred embodiment of the present invention with reference to the attached drawings in which.

DETAILED DESCRIPTION OF THE PREFERRED EMBODIMENTS

The preferred embodiments according to the present invention will be described in more detail with reference to the attached drawings.

Figure 2:
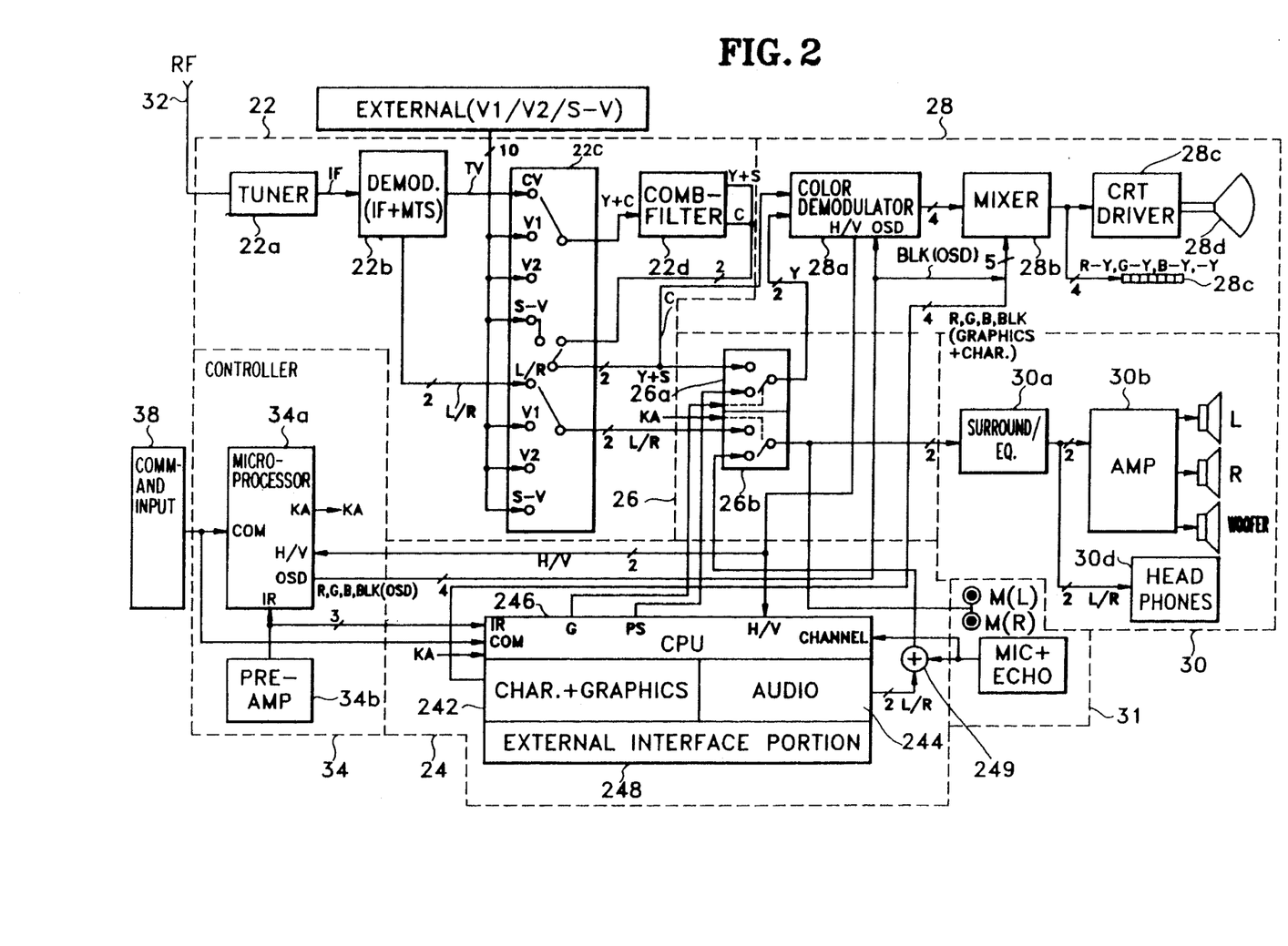
FIG. 2 is a detailed block diagram of a television receiver according to one embodiment of the present invention.

In FIG. 2, a reference numeral 22 indicates a television signal generator, 24 is a video accompaniment signal generator, 26 is a selector, 28 is a video output circuit, 30 is a audio output circuit, 34 is a controller for controlling the overall operation of the equipment, and 38 is a command input circuit.

Television signal generator 22 advantageously includes a tuner 22a for tuning the carrier frequency of a broadcast signal received via antenna 32 and thereby extracting a selected broadcast signal, a demodulator 22b for demodulating an intermediate frequency (IF) signal into a composite video signal and an audio signal, a television signal selector 22c for selecting one among the output signal from demodulator 22b and an externally input signal, and a luminance/chrominance signal separator 22d for receiving the composite video signal from television signal selector 22c and separating the received composite video signal into a luminance signal including sync signal and a chrominance signal. Preferably, television signal selector 22c selects and outputs either the video signal input through an external input terminal or the normally received television signal.

Video accompaniment signal generator 24 advantageously includes a graphics/character signal generator 242 for generating a graphics signal and a character signal, an accompaniment signal generator 244 for generating an accompaniment signal, a video accompaniment controller 246 for controlling the functions of graphics/character signal generator 242 and accompaniment signal generator 244, an external interface circuit 248 for receiving externally supplied graphics/character information and audio source information, and an audio mixer 249 for mixing the audio signal which is supplied through an external audio signal input apparatus and the accompaniment signal from accompaniment signal generator 244.

Selector 26 advantageously includes a first selector 26a for selecting and providing either a sync signal from television signal generator 22 or a pseudo-sync signal from video accompaniment signal generator 24, and a second selector 26b for selecting and providing either the audio signal from television signal generator 22 or the accompaniment signal from video accompaniment signal generator 24.

Video output circuit 28 advantageously includes a color demodulator 28a for receiving the composite video signal from television signal generator 22 and the output signal from selector 26, and demodulating the received signal into color difference signals R-Y, G-Y and B-Y, a video signal mixer 28b for receiving the output signal of color demodulator 28a and the graphics signal and character signal from video accompaniment signal generator 24 and generating a combined signal, a driver 28c for driving a cathode ray tube (CRT) and a CRT 28d. Preferably, video output circuit 28 further includes a color difference signal output terminal 28e for externally providing color difference signals R-Y, G-Y and B-Y and the luminance signal (Y) from video signal mixer 28b.

Audio output circuit 30 advantageously includes a surround/equalizing circuit 30a for receiving the output signal from selector 26 and surround- and equalizing-processing the received signal, an amplifier 30b for amplifying the output signal of surround/equalizing circuit 30a, left (L) and right (R) speakers and a woofer for receiving the output of amplifier 30b and generating audio outputs, and a headphone output circuit 30d for providing the output of surround/equalizing circuit 30a as a headphone output.

Controller 34 advantageously includes a microprocessor 34a for controlling the overall operation of the television receiver by executing a software program incorporated therein and a preamplifier 34b for interfacing a control command from a remote control apparatus.

Command input circuit 38 advantageously includes at least a television/video accompaniment mode selection key, a video signal selection key for accompaniment, a numerical keypad for selecting a program (the desired song), a start/cancel key, a reserve key, a tone adjustment key and a speed adjustment key.

Figure 3:
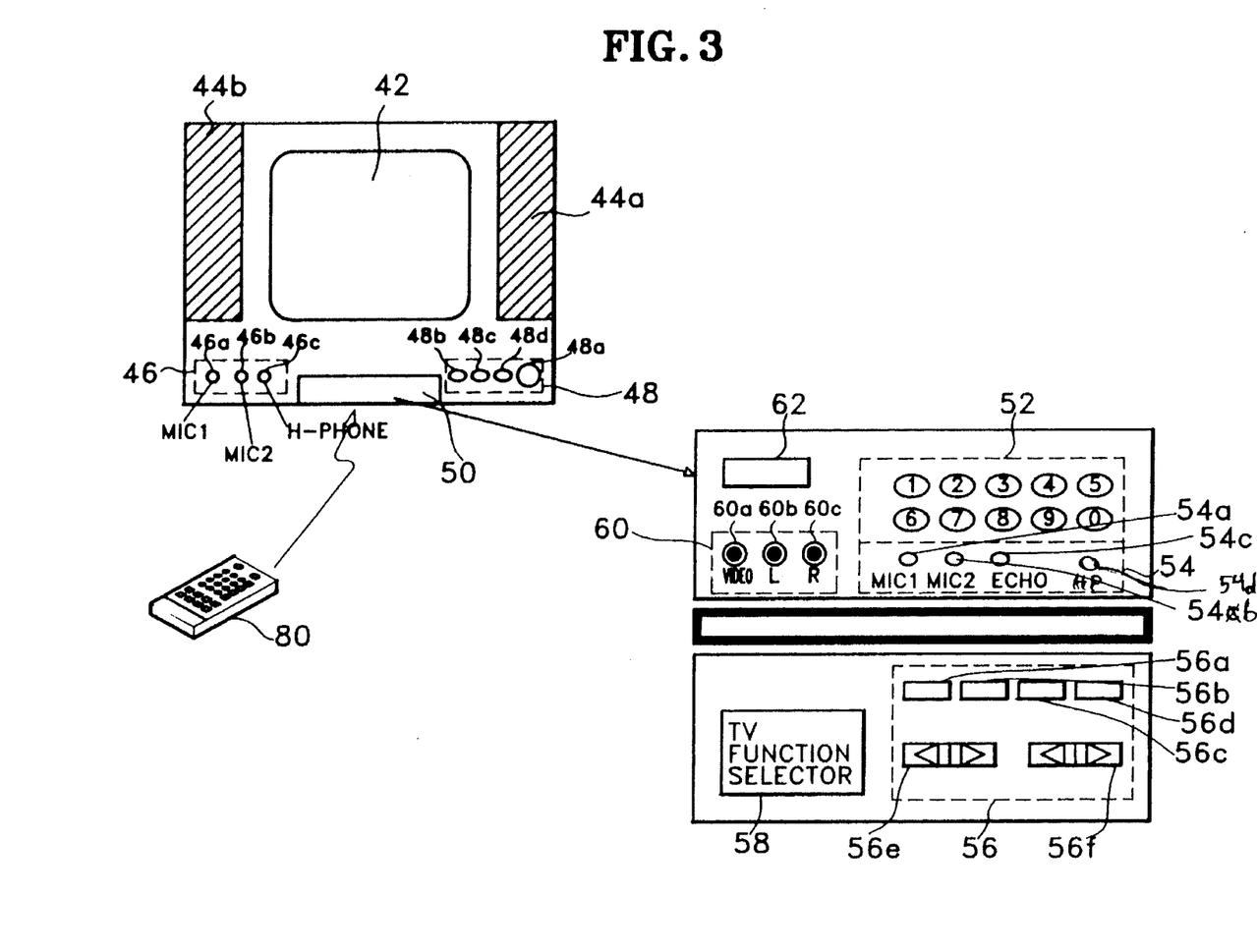
FIG. 3 is a schematic front view of the television receiver according to the present invention.

FIG. 3 shows an external structure of the television receiver according to the present invention. The television receiver shown in FIG. 3 advantageously includes a CRT circuit 42, speaker circuits 44a and 44b, an audio input/output circuit 46, a television adjustment circuit 48 and a video accompaniment adjustment circuit 50. Audio input/output circuit 46 includes first and second microphone input terminals 46a and 46b and a headphone output terminal 46c. Television adjustment circuit 48 advantageously includes a power adjustment terminal 48a, tint, brightness and color adjustment terminals 48a, 48b and 48c.

Video accompaniment adjustment circuit 50 advantageously includes a numerical keypad for selecting programs, an input/output adjustment circuit for adjusting the input/output level of audio input/output circuit 46, a video accompaniment function selector 56, a television function selector 58, an external output terminal 60 and an external memory interface terminal 62. Input/output adjustment circuit 54 includes control keys 54a and 54b for controlling the audio input of first and second microphone input terminals 46a and 46b, an echo adjustment circuit 54c and a headphone adjustment circuit 54d for adjusting a headphone output of headphone output terminal 46c.

Video accompaniment function selector 56 includes a mode selection key 56a for selecting a television/video accompaniment mode, a video signal selection key for accompaniment 56b, a start/cancel key 56c for instructing a starting and a halt of the accompaniment signal, a reserve set key for selecting a reserve mode, a tone adjustment key 56e for adjusting a tone of the accompaniment signal, and a speed adjustment key 56f for adjusting the speed of the accompaniment signal.

External output terminal 60 advantageously includes a video output terminal 60a for generating a graphics signal and a character signal and audio output terminals 60b and 60c for generating stereo-R and stereo-L signals.

Operation will now be described below with reference to FIGS. 2 and 3. The television receiver according to the present invention advantageously includes largely a video-related system and an audio-related system, so that the conventional functions of the television receiver and the video accompaniment apparatus can be performed. That is, channel selection, video selection, adjustment of volume, tone, balance etc., are all preformed during the operation of the television functions (hereinafter called a television mode), and during the operation of the functions of the video accompaniment apparatus (hereinafter called a video accompaniment mode), program selection, adjustment of tone and speed, a reserve set, etc., are performed.

Particularly, in the video accompaniment mode, the audio signal is supplied by only the video accompaniment signal generator 24, while the video signal can be supplied by selecting one among the selected channel broadcast signal (selected by the television receiver), the externally-supplied signal, and the graphics signal generated in video accompaniment signal generator 24. Accordingly, an image providing just the right atmosphere can be provided which correlates to the mood or subject of the song.

During operation of the video-related system, a broadcast signal (RF signal) which is input to a tuner 22a through an antenna 32 is converted into an IF signal to be input a demodulator 22b. The IF signal input to demodulator 22b is divided into a composite video signal CV and an audio signal L/R and input to television signal selector 22c. Preferably, television signal selector 22c receives the externally supplied signals. That is, signals V1 and V2 from first and second video signal sources (not shown) and a signal S-V from a super-VHS signal source (not shown) are input to television signal selector 22c. One of video signals CV, V1 or V2, which one is selected in television signal selector 22c, is input to luminance/chrominance signal separator 22d. Luminance signal Y+S including the sync signal separated in luminance/chrominance signal separator 22d is input to one port of first selector 26a in selector 26 and chrominance signal C is input to color demodulator 28a. On the other hand, pseudo-sync signal PS generated from video accompaniment signal generator 24 is input to the other port of first selector 26a. Signal Y+S or signal PS selected by first selector 26a is input to color demodulator 28a.

On the other hand, when the super-VHS signal S-V is selected in television signal selector 22c, the selected signal is directly input to color demodulator 28a and first selector 26a without passing through luminance/chrominance signal separator 22d.

First selector 26a is controlled by a graphics mode signal G generated in video accompaniment signal generator 24. When graphics mode signal G is "ON," pseudo-sync signal PS from video accompaniment signal generator 24 is selected and output, while in the "OFF" case, the video signal from television signal selector 22c is selected and output.

Chrominance signal C and luminance signal Y+S input to color demodulator 28a are demodulated into color difference signals R-Y, G-Y, B-Y and luminance signal Y, and then input to video signal mixer 28b. Sync signal H/V extracted from luminance signal Y+S including the composite sync signal is provided in video accompaniment signal generator 24 and controller 34. The on-screen-display (OSD) signal applied from controller 34 to color demodulator 28a is combined with the demodulated color difference signal, and then the combined signal is output.

The graphics and character signals from video accompaniment signal generator 24 are input to the other port of video signal mixer 28b as four types signals (R, G, B and BLK), and are mixed with the color difference signal supplied from color demodulator 28a. The mixed signal is then supplied to CRT driver 28c. Preferably, by applying a blanking signal BLK__OSD from controller 34 and a blanking signal from video accompaniment signal generator 24 to video signal mixer 28b, the priority is established in the sequence of the OSD signal from controller 34, the graphics signal and the character signal from video accompaniment signal generator 24 and the signal from television signal generator 22.

During the operation of the audio-related system, one of the audio signals L/R, V1, V2 or S-V (selected by television signal selector 22c) is input to second selector 26b in selector 26. If the television mode is selected in controller 34, second selector 26b selects the audio signal from television signal selector 22c, while if a karaoke mode is selected, that is, the video accompaniment mode KA is selected, the accompaniment signal from video accompaniment signal generator 24 is selected. Then, the selected signal is supplied to audio output circuit 30. The signal output from second selector 26b is input surround/equalizing circuit 30a, and is then surround-processed and equalization-processed. Then, the thus-processed signal is supplied to amplifier 30b. The signal amplified in amplifier 30b is provided as the audio output by speakers L, R and the woofer.

A vocal signal input through a microphone input circuit 31 is mixed with the accompaniment signal from video accompaniment signal generator 24 in audio mixer 249, so as to be provided as the accompaniment signal of second selector 26b.

Figure 4:
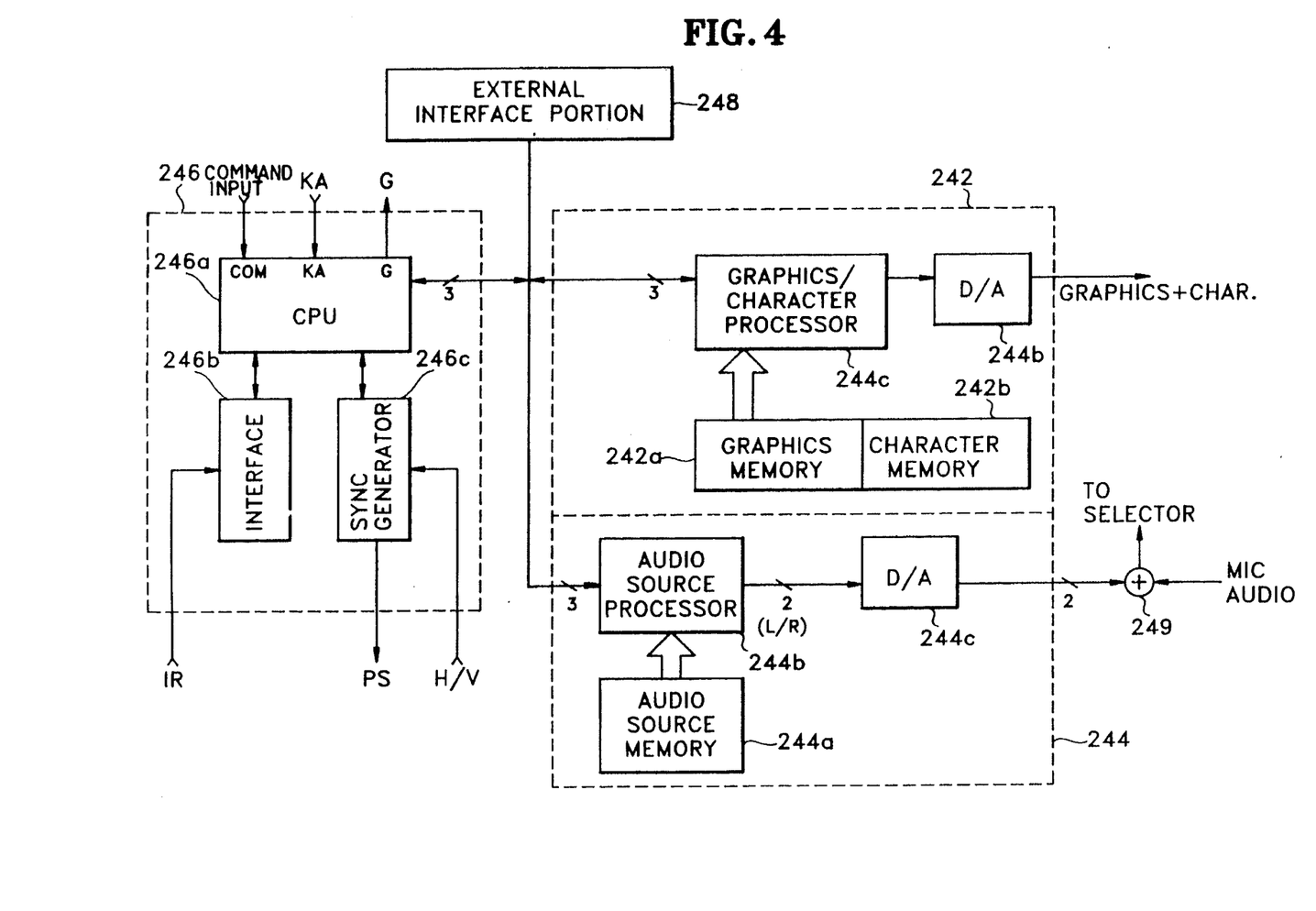
FIG. 4 shows a remote control apparatus of the television receiver according to the present invention.

FIG. 4 is a detailed block diagram of the video accompaniment signal generator shown in FIG. 2. As shown in FIG. 4, graphics/character signal generator 242 advantageously includes a graphics memory 242a for storing graphics information, a character memory 242b for storing character information, a graphics/character processor 242c for combining the graphics information read out from graphics memory 242a and the character information read out from character memory 242b, and a digital-to-analog converter 242d for converting the digital output from graphics/character processor 242c into an analog signal.

Accompaniment signal generator 244 advantageously includes an audio source memory 244a for storing audio source information, an audio source information processor 244b for receiving the audio source information read out from audio source memory 244a, and converting the received information into an accompaniment signal, and a digital-to-analog converter 244c for converting the digital output from audio source information processor 244b into an analog signal. Preferably, the audio source information which is stored in audio source memory 244a is from a mini disk (MIDI).

Video accompaniment controller 246 advantageously includes a microprocessor 246a for controlling graphics/character signal generator 242 and accompaniment signal generator 244 by executing the incorporated software program, an interface circuit 246b for receiving a remote control instruction from a remote control apparatus (not shown) and transmitting the received instruction to microprocessor 246a, and a sync signal generator 246c for generating a pseudo-sync signal equal to the sync signal of the television signal.

In an operation of the video accompaniment signal generator shown in FIG. 4, microprocessor 246a of video accompaniment controller 246 executes the incorporated software program and controls the entire operation of video accompaniment signal generator 24. Graphics/character signal generator 242, accompaniment signal generator 244 and video accompaniment controller 246 are connected with each other through a bus having data, address and control signal lines. Microprocessor 246a of video accompaniment controller 246 controls graphics/character signal generator 242 and accompaniment signal generator 244 to generate the graphics signal, the character signal and the accompaniment signal corresponding to the designated song through the bus. Sync signal generator 246b generates pseudo-sync signal PS.

Interface circuit 246c receives the remote control instruction from the remote control apparatus (not shown) and transmits the received instruction to microprocessor 246a. The remote control instruction transmitted from the remote control apparatus is simultaneously applied to controller 34 of FIG. 2 and video accompaniment controller 246 of FIG. 246. That is, if the remote control instruction is a control instruction of the television, controller 34 operates, while if the remote control instruction is a video accompaniment control instruction, video accompaniment signal generator 24 operates. Pseudo-sync signal PS keeps the synchronization of graphics/character signal generator 242 and video output circuit 28 when a graphics signal is applied from video accompaniment signal generator 24 to video output circuit 28. When the conventional television signal is applied to video output circuit 28, synchronization of graphics/character signal generator 242 is maintained by sync signal H/V generated in color demodulator 28a.

In the operation of accompaniment signal generator 244, interval data, timing data, tone data for each program (song) is recorded in audio source memory 244a according to the MIDI standard. The audio source information read out from audio source information memory 244a is input to audio source processor 244b in which the read audio source information is formed of serial data of a stereo L-channel and a stereo R-channel so as to be transmitted to a digital-to-analog converter 244c. The analog signals of the stereo L-channel and the stereo R-channel are mixed with the vocal signal input through the microphone in audio mixer 249, so as to be supplied to selector 26 of FIG. 2.

The graphics information is stored in graphics memory 242a of graphics/character signal generator 242. The lyrics information corresponding to the respective programs is stored in character memory 242b. The graphics information and the lyrics information (character information) read out from graphics memory 242a and character memory 242b are combined by graphic/character information processor 242c, to then be supplied to digital-to-analog converter 242d. Digital-to-analog converter 242d generates the graphics/character signal as patterns of the red (R), green (G) and blue (B) color signals.

When the graphic signal is selected to be applied to video output circuit 28 in video accompaniment signal generator 24, the graphics information is read out from graphics memory 242a, to then be supplied to graphics/character information processor 242c. On the other hand, when the composite video signal is selected to be supplied to video output circuit 28, the graphics information is not read out from graphics memory 242a.

External interface circuit 248 is used for adding programs to those already incorporated in video accompaniment signal generator 24, or for adapting a recording medium containing particular programs. That is, ordinarily, when a user selects a program, a RAM-type pack is manufactured. Preferably, in the event of special purpose programs such as hymns, children's songs, a ROM-type pack can be manufactured. Accordingly, these RAM-type or ROM-type packs can be used by connection to the television receiver according to the present invention through external interface circuit 248.

Figure 5:
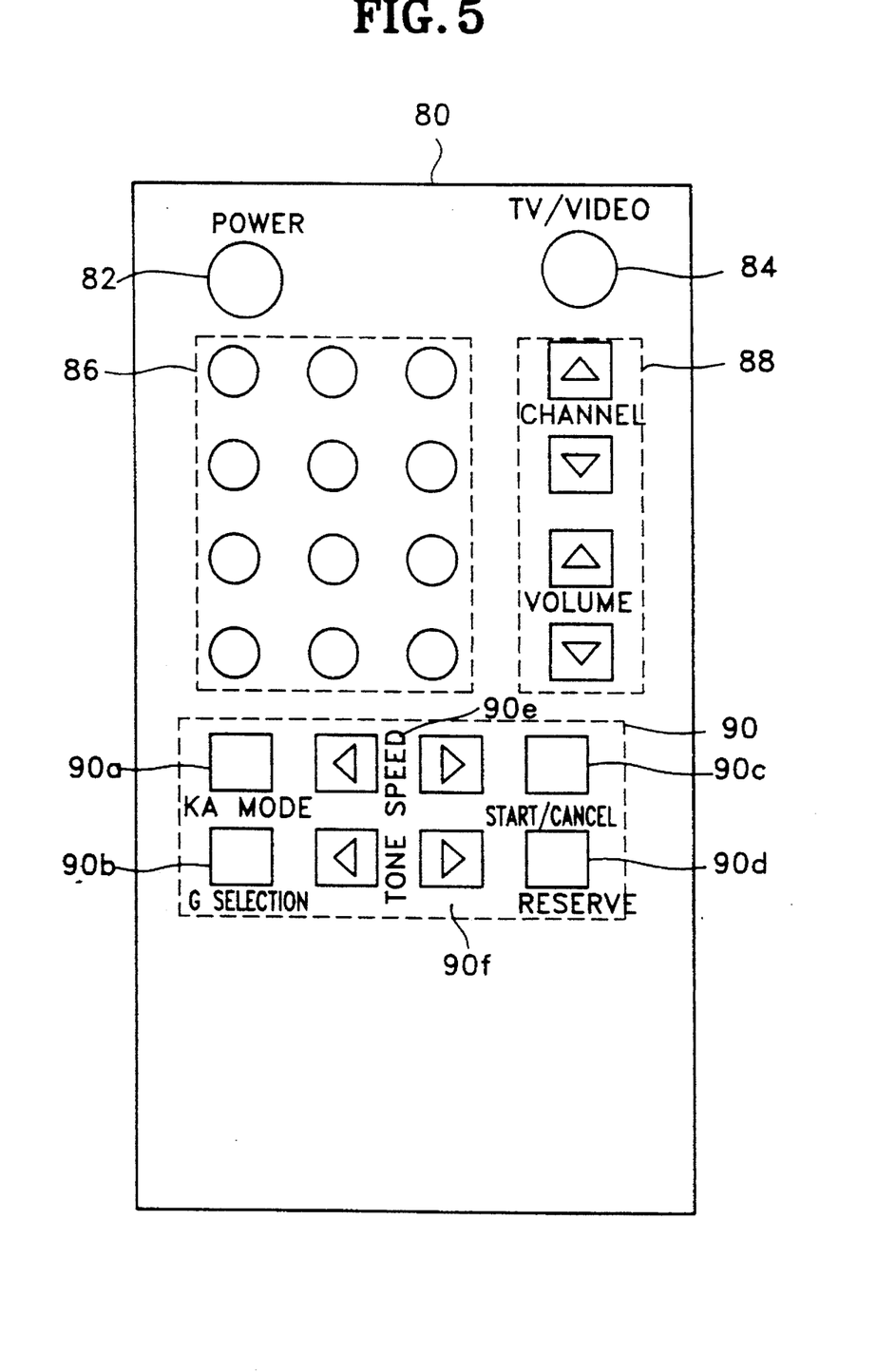
FIG. 5 is a specific block diagram of the video accompaniment signal generator shown in FIG. 2.

FIG. 5 shows one embodiment of the remote control apparatus adapted for the television receiver according to the present invention. The remote control apparatus of FIG. 5 advantageously includes a power key 82, television/video mode selection key 84, a numerical keypad 86 for selecting channels and programs, a television function selector 88, and a video accompaniment function selector 90, which are the same as those of the conventional remote control apparatus.

Video accompaniment function selector 90 advantageously includes a television/video accompaniment mode selection key 90a for selecting the functions of the video accompaniment, a video signal selection key for determining which is an input signal of video output circuit 28 for accompaniment, a start/cancel key 90c for activating the starting and stopping of the accompaniment signal, a reserve set key 90d for specifying a preprogrammed function, a tone adjustment key 90e for adjusting the tone of the accompaniment signal and a speed adjustment key 90f for adjusting the speed of the accompaniment signal.

Numerical keypad 86 is commonly used for the television mode and the karaoke mode. However, the same key on numerical keypad 86 can generate varying data corresponding to the state of mode control key 90a.

Figure 6A:
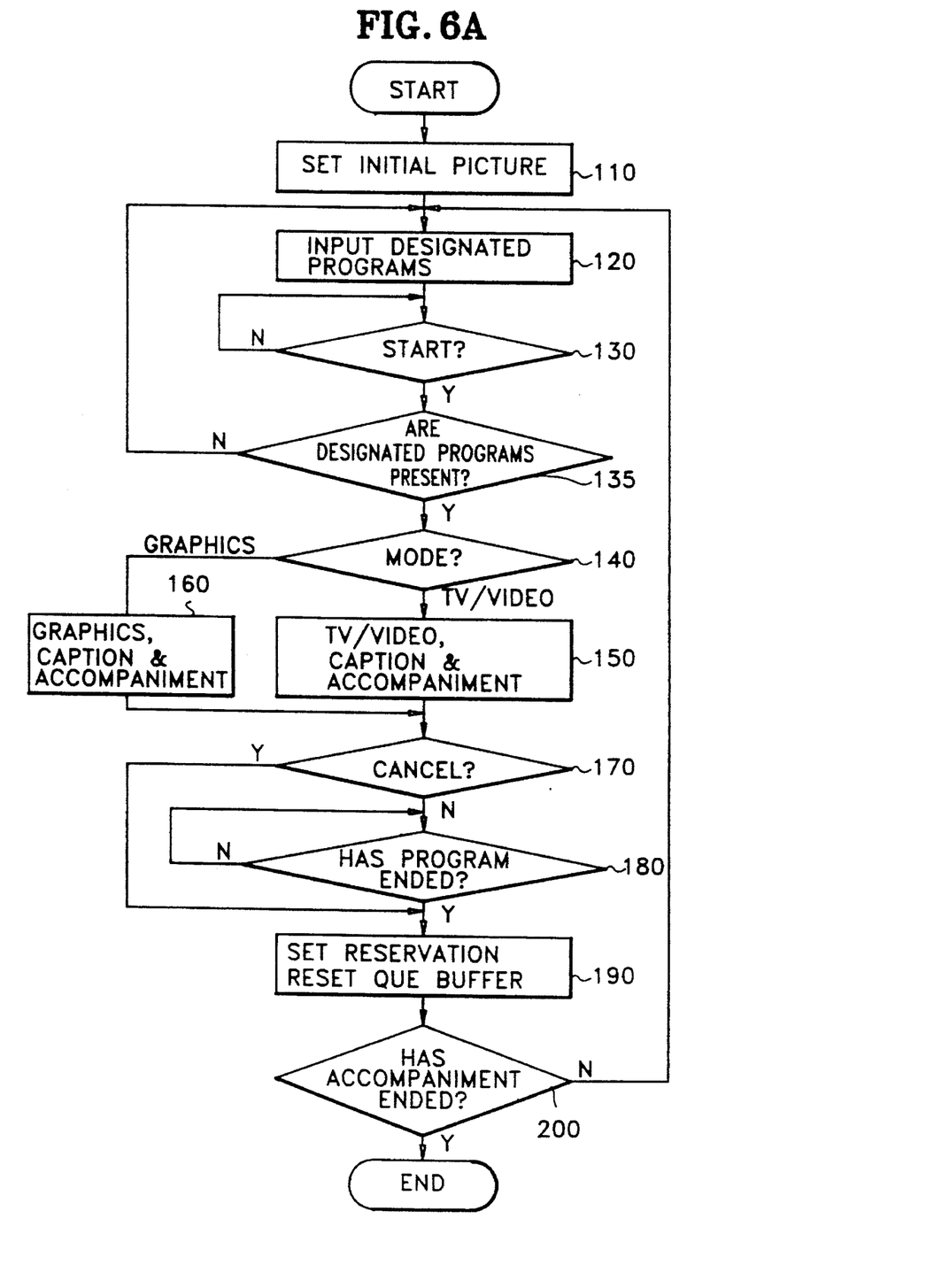
FIGS. 6A and 6B are flowcharts which illustrate exemplary steps which can be employed in providing the video accompaniment functions of the television receiver according to the present invention.
Figure 6B:
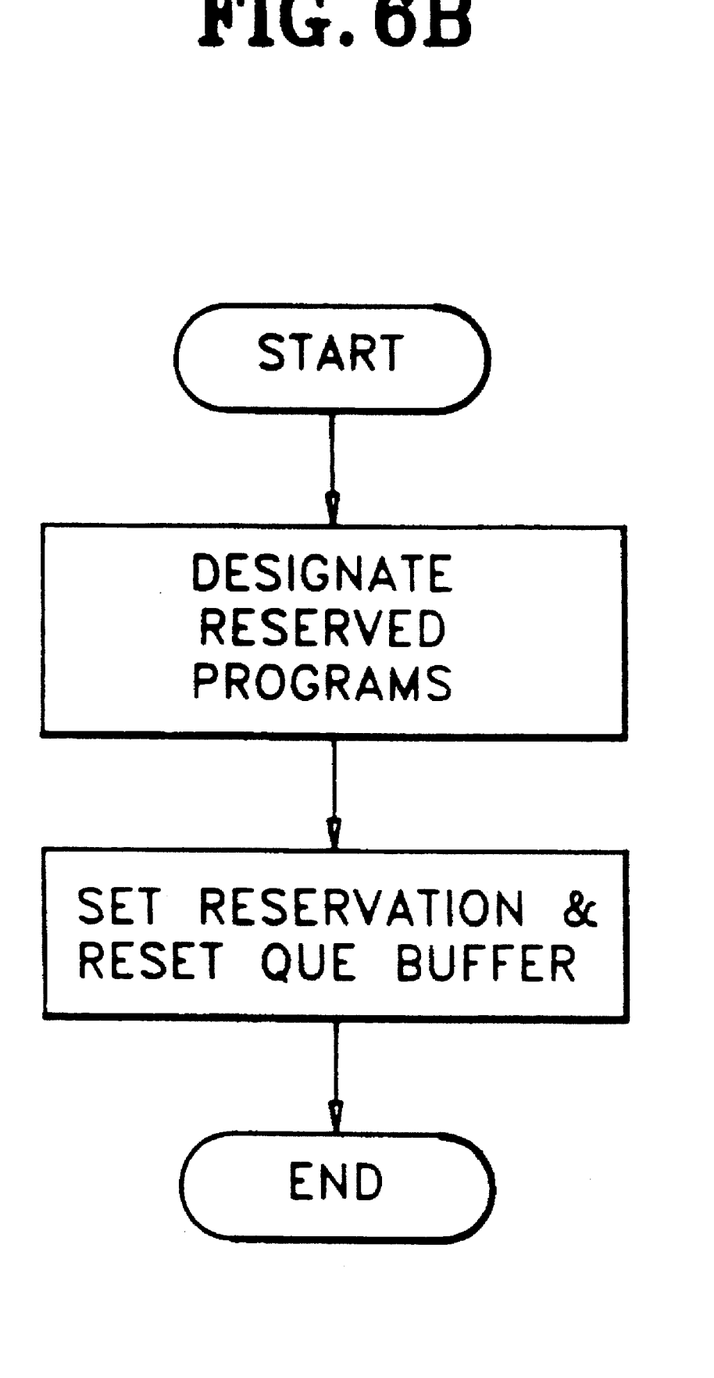

FIGS. 6A and 6B are flowcharts showing the operation of the television receiver according to the present invention. Preferably, when the television mode is selected, since its operation is the same as the control operation of the conventional television receiver, the detailed description will be omitted. On the other hand, in the flowchart of FIG. 6A, it is assumed that the karaoke mode has been selected initially.

When the karaoke mode is selected, an initial picture is displayed through video output circuit 28. The software program incorporated in microprocessor 246a initiates a preparation step for program selection (step 110). The designated programs (songs) are input in step 120. Step 130 waits until the accompaniment start instruction is input. In step 135, it is detected whether remaining programs are present in a reserve que buffer for programmed settings, and if none remain therein, the software program proceeds to step 120 and awaits the input of a designated program. If the accompaniment start instruction is input, it is determined which graphics mode is set, in step 140.

In step 150, if the graphics mode is set as a television/video signal mode, the outputs of television signal generator 22 and graphics/character signal generator 242 are output through video output circuit 28, and the accompaniment signal of accompaniment signal generator 244 is output through audio output circuit 30.

In step 160, if the graphics mode is set as a graphics signal mode, pseudo-sync signal PS of video accompaniment signal generator 22 and the output of graphics/character signal generator 242 are output through video output circuit 28, and the accompaniment signal of accompaniment signal generator 244 is output through audio output circuit 30.

Then, in step 170, if the cancel instruction is input, the software program proceeds to step 190, and if not, proceeds to step 180. In step 180, it is determined whether a selected program is finished. If the program is not finished, step 180 is continuously performed until it is. In step 190, the program finally played is deleted in a que buffer for preprogrammed setting. In step 200, it is determined whether the karaoke mode is finished. If the karaoke completion instruction is not input, the software program returns to step 120, and if the completion instruction is input, the video accompaniment function is completed.

The flowchart shown in FIG. 6B illustrates the preprogrammed setting function. During preprogrammed setting, if an initial state is active, that is, if no programs remain in the preprogrammed buffer que, the operation of the preprogrammed setting function is prevented.

In step 210, if the preprogrammed setting instruction is input, the system is ready to designate the reservation of programs. Then, in step 220, the designated programs are input in the preprogrammed setting buffer que. The preprogrammed reservation is then completed.

Figure 7:
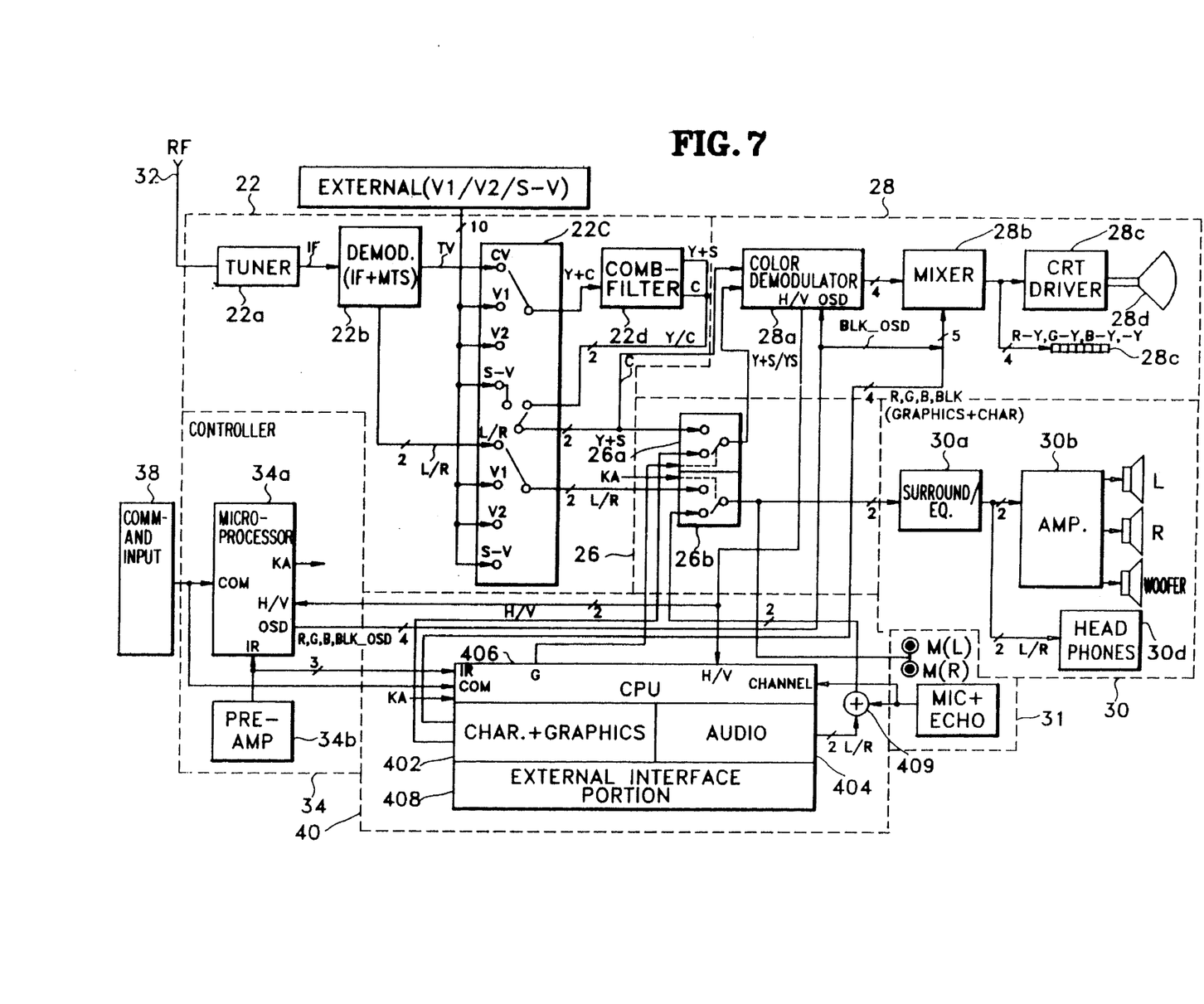
FIG. 7 is a high level block diagram of a television receiver according to another embodiment of the present invention.

FIG. 7 shows another embodiment of the television receiver according to the present invention. In FIG. 7, since like reference numerals as shown in FIG. 2 designate like elements, their detailed description will be omitted.

In the operation of the constitution shown in FIG. 7, video accompaniment signal generator 40 provides a background video signal for the background picture. The background video signal is supplied to first selector 26a. First selector 26a supplies the video signal from television signal generator 22 and the background video signal from video accompaniment signal generator 40 to video output circuit 28, according to the set of graphics mode signal G.

Figure 8:
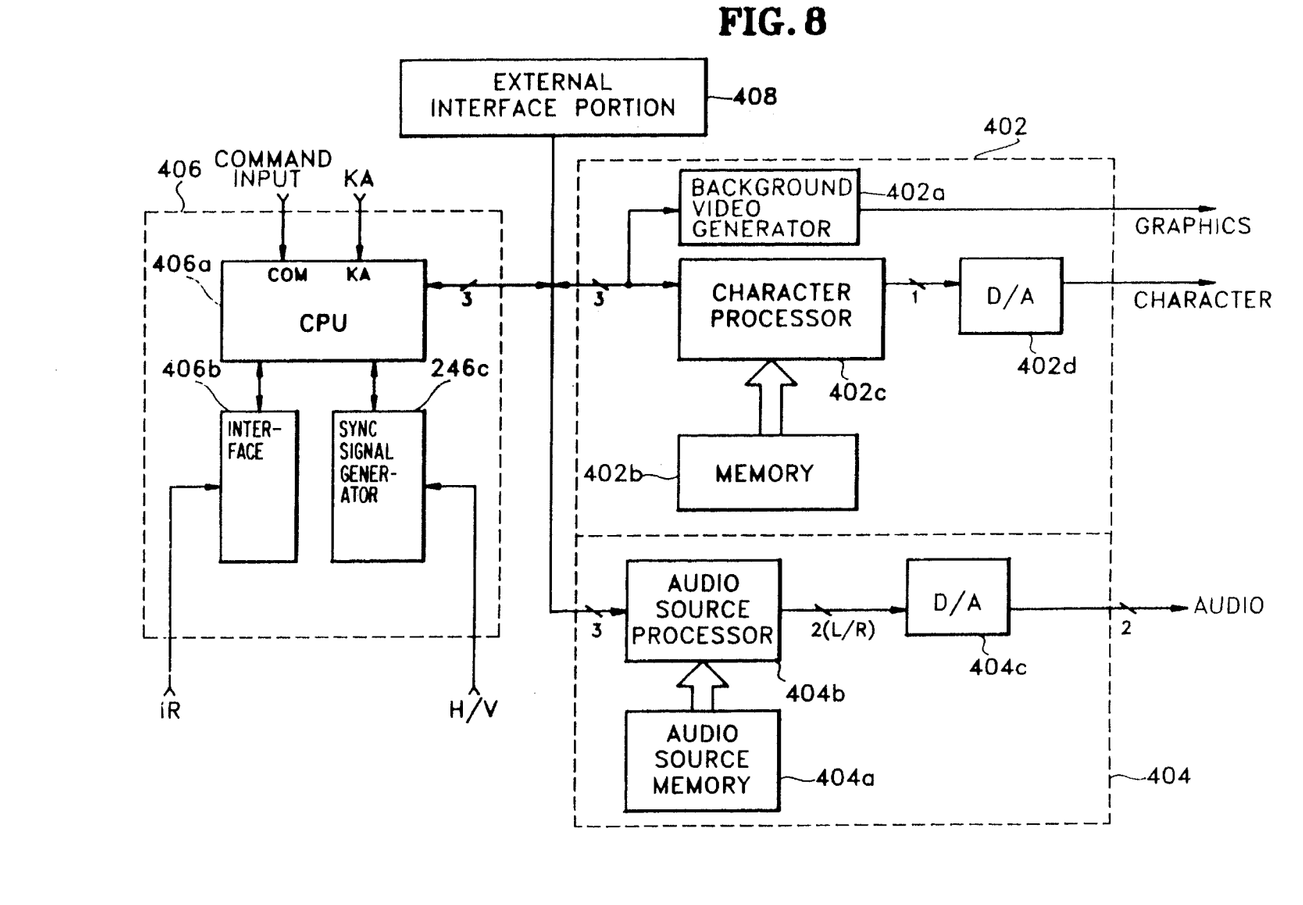
FIG. 8 is a specific block diagram of the video accompaniment signal generator shown in FIG. 7.

FIG. 8 is a detailed block diagram of video accompaniment signal generator 40 shown in FIG. 7. Video accompaniment signal generator 40 shown in FIG. 8 advantageously includes an accompaniment video/character signal generator 402, an accompaniment signal generator 404 for generating the accompaniment sound, a video accompaniment controller 406 for controlling the operations of accompaniment video/character signal generator 402 and accompaniment signal generator 404, an external interface circuit 408 for receiving the graphics/character information and the audio information which are supplied from the external source so as to be supplied to accompaniment video/character signal generator 402 and accompaniment signal generator 404.

Graphics/character signal generator 402 advantageously includes a background video generator 402a, a character memory 402b for storing character information, a character processor 402c for processing the character information read out from character memory 402b, and a digital-to-analog converter 402d for converting the digital output from character processor 402c into an analog signal.

Accompaniment signal generator 404 is the same as accompaniment signal generator 244 shown in FIG. 4, and video accompaniment controller 406 is the same as video accompaniment controller 246 shown in FIG. 4.

As described above, when the television receiver according to the present invention incorporates the video accompaniment apparatus therein, the video signal supplied from the external signal source or the graphics signal supplied from the video accompaniment signal generator can be selected, thereby providing various pictures during performing the video accompaniment functions.

Preferably, the television receiver according to the present invention can provide a pseudo-sync signal when the graphics signal supplied from the video accompaniment signal generator is output through the video output circuit, thereby enabling a stable video output.

Furthermore, the present invention incorporates the functions of controlling a television receiver and video accompaniment apparatus with a single remote control apparatus, thereby increasing user convenience.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. A television receiver having a video accompaniment function comprising:
    a television signal generator for receiving a television signal and providing a video signal and an audio signal;
    a video accompaniment signal generator for reading background/lyrics information and accompaniment information of a program selected among a plurality of programs stored in a memory, providing a video signal for accompaniment and an accompaniment signal, and generating a pseudo-sync signal;
    a first selector for selectively providing the video signal supplied from the television signal generator and the pseudo-sync signal supplied from the video accompaniment signal generator;
    a second selector for selectively providing the audio signal supplied from the television signal generator and the accompaniment signal supplied from the video accompaniment signal generator;
    a video output unit for receiving a first signal selected from the first selector and the accompaniment video signal and for providing the received signal as a video output;
    an audio output unit for receiving a second signal selected in the second selector and providing the received signal as an audio output; and a controller for controlling said video accompaniment signal generator, said first selector and said second selector responsive to selection between a television mode of operation and a video accompaniment mode of operation.

2. The television receiver according to claim 1, further comprising an audio signal mixer for mixing said accompaniment signal supplied from said video accompaniment signal generator and the audio signal input through a microphone and supplying a mixed signal to said second selector.

3. The television receiver according to claim 1, further comprising:
an instruction input circuit including
a television/video accompaniment mode selection key;
an accompaniment video signal selection key;
a numerical keypad for program selection;
a start/cancel key;
a reserve key;
a volume adjustment key; and
a speed adjustment key,
wherein said instruction input circuit permits input of an instruction signal to said controller.

4. The television receiver according to claim 3, wherein said first selector is controlled so as to perform a switching operation according to the accompaniment mode selection key signal generated by said instruction input circuit.

5. The television receiver according to claim 3, wherein said second selector is controlled so as to perform a switching operation according to the television/video accompaniment mode selection key signal generated by said instruction input circuit.

6. The television receiver according to claim 1, further comprising:
a remote controller for permitting input of an instruction signal to said controller including
a channel up/down key;
a volume up/down key;
a television/video accompaniment mode selection key;
an accompaniment video signal selection key;
a numerical keypad for program selection;
a start/cancel key;
a reserve key;
a tone up/down key; and
a speed up/down key.

7. The television receiver according to claim 6, wherein said remote controller commonly uses said numerical keypad so as to select channels in said television mode and select programs in said video accompaniment mode.

8. The television receiver according to claim 1, wherein said video accompaniment signal generator comprises: a graphics/character signal generator for generating a graphics signal and a character signal; an accompaniment signal generator for generating an accompaniment audio signal; and a video accompaniment controller for controlling the operation of said graphics/character signal generator and said accompaniment signal generator, and for generating a pseudo-sync signal.

9. The television receiver according to claim 8, wherein said graphics/character signal generator comprises:
a graphics memory for storing graphics information;
a character memory for storing character information; and
a graphics/character processor for combining the graphics information read from said graphics memory and the character information read from said character memory to produce a combined signal, and converting said combined signal into a television signal having a predetermined format.

10. The television receiver according to claim 8, wherein said accompaniment signal generator comprises:
an audio source memory for storing audio information; and
an audio source information processor for receiving the audio information read from said audio source memory to provide a received signal, and converting said received signal into an accompaniment signal for output.

11. The television receiver according to claim 10, wherein said audio information is supplied from a mini disk (MIDI).

12. The television receiver according to claim 8, wherein said video accompaniment controller comprises:
a microprocessor for controlling said graphics/character signal generator and said accompaniment signal generator responsive to a software program incorporated therein;
an interface circuit for receiving a control instruction input from a remote control apparatus, and transmitting the received control instruction to said microprocessor; and
a sync signal generator for generating a pseudo-sync signal identical to the sync signal of said television signal.

13. The television receiver according to claim 8, wherein said video accompaniment signal generator further comprises an external interface circuit for receiving the graphics/character information and the audio source information supplied from an external source, and supplying received said graphics/character information and said audio source information to said graphics/character signal generator and said accompaniment signal generator.

14. The television receiver according to claim 13, wherein said external interface circuit is a read only memory (ROM) pack interface device.

15. The television receiver according to claim 13, wherein said external interface circuit is a random access memory (RAM) pack interface device.

16. The television receiver according to claim 13, wherein said external interface circuit is a memory card interface device.

17. A television receiver having a video accompaniment function comprising:
a television signal generator for receiving a television signal and providing a video signal and an audio signal;
a video accompaniment signal generator for reading background/lyrics information and accompaniment information of a program selected among a plurality of programs stored in a memory, and providing a video signal for accompaniment and an accompaniment signal;
a first selector for selectively providing the video signal supplied from the television signal generator and the accompaniment video signal supplied from the video accompaniment signal generator;
a second selector for selectively providing the audio signal supplied from the television signal generator and the accompaniment signal supplied from the video accompaniment signal generator;
a video output unit for receiving a first signal selected from the first selector and the accompaniment video signal and providing the received signal as a video output;
an audio output unit for receiving a second signal selected in the second selector and providing the received signal as an audio output; and a controller for controlling said video accompaniment signal generator, said first selector and said second selector responsive to selection of a television mode of operation and video accompaniment mode of operation.

18. The television receiver according to claim 17, further comprising an audio signal input circuit for mixing said accompaniment signal supplied from said video accompaniment signal generator and the audio signal input through a microphone and supplying a mixed signal to said second selector.

19. The television receiver according to claim 17, further comprising:
   an instruction input circuit including
      a television/video accompaniment mode selection key;
      an accompaniment video signal selection key;
      a numerical keypad for program selection;
      a start/cancel key;
      a reserve key;
      a tone adjustment key; and
      a speed adjustment key,
   wherein said instruction input circuit permits input of an instruction signal to said controller.

20. The television receiver according to claim 19, wherein said first selector is controlled so as to perform a switching operation according to the accompaniment mode selection key signal of said instruction input circuit.

21. The television receiver according to claim 19, wherein said second selector is controlled so as to perform a switching operation according to the television/video accompaniment mode selection key signal of said instruction input circuit.

22. The television receiver according to claim 17, further comprising:
   a remote controller including
      a channel up/down key;
      a volume up/down key;
      a television/video accompaniment mode selection key;
      an accompaniment video signal selection key;
      a numerical keypad for program selection;
      a start/cancel key;
      a reserve key;
      a tone up/down key; and
      a speed up/down key,
   wherein said remote controller permits input of an instruction signal to said controller.

23. The television receiver according to claim 22, wherein said remote controller commonly uses said numerical keypad so as to select channels in a television mode and select programs in said video accompaniment mode.

24. The television receiver according to claim 17, wherein said video accompaniment signal generator comprises: an accompaniment video/character signal generator for generating an accompaniment video signal and a character signal; an accompaniment signal generator for generating an accompaniment audio signal; and a video accompaniment controller for controlling the operation of said accompaniment video/character signal generator and said accompaniment signal generator.

25. The television receiver according to claim 24, wherein said accompaniment video/character signal generator comprises:
   an accompaniment video generator for generating said accompaniment video signal;
   a character memory for storing character information; and
   a character processor for processing the character information read from said character memory.

26. The television receiver according to claim 24, wherein said accompaniment signal generator comprises:
   an audio source memory for storing audio information; and
   an audio source information processor for receiving the audio information read from said audio source memory as a received signal, and converting the received signal into an accompaniment signal for output.

27. The television receiver according to claim 26, wherein said audio information is mini disk (MIDI) information.

28. The television receiver according to claim 24, wherein said video accompaniment controller comprises:
   a microprocessor for controlling said accompaniment video/character signal generator and said accompaniment signal generator by performing a software program incorporated therein; and
   an interface circuit for receiving a control instruction which is input from a remote control apparatus, and transmitting the received control instruction to said microprocessor.

29. The television receiver according to claim 24, wherein said video accompaniment signal generator further comprises an external interface circuit for receiving the video/character information and the audio source information supplied from an external source, and supplying the received said graphics/character information and said audio source information to said accompaniment video/character signal generator and said accompaniment signal generator.

30. The television receiver according to claim 29, wherein said external interface circuit is a ROM pack interface device.

31. The television receiver according to claim 29, wherein said external interface circuit is a RAM pack interface device.

32. The television receiver according to claim 29, wherein said external interface circuit is a memory card interface device.

33. A television receiver providing a video accompaniment function and having a television signal generator for receiving a television signal and providing a video signal and an audio signal, a video output unit for receiving a selected video signal as a video output and an audio output unit for receiving a selected audio signal as an audio output, said receiver comprising:
   a video accompaniment signal generator for reading background and lyric information and accompaniment information corresponding to a program selected from a plurality of programs stored in a memory, and providing an accompaniment video signal and an accompaniment audio signal;
   a first selector for providing a selected one of the video signal supplied from the television signal generator and the accompaniment video signal supplied from the video accompaniment signal generator to said video output unit as said selected video signal;
   a second selector for providing a selected one of the audio signal supplied from the television signal generator and the accompaniment audio signal supplied from the video accompaniment signal generator to said audio output unit as said selected audio signal; and
   a controller for controlling said video accompaniment signal generator, said first selector and said second selector responsive to mode selection between a television mode of operation and a video accompaniment mode of operation.

34. The television receiver according to claim 33, further comprising an audio signal input circuit for mixing said accompaniment audio signal supplied from said video accompaniment signal generator and the audio signal input through a microphone and supplying a mixed signal to said second selector.

35. The television receiver according to claim 33, further comprising an instruction input circuit including a television/video accompaniment mode selection key, an accompaniment video signal selection key, a numerical keypad for program selection, a start/cancel key, a reserve key, a tone adjustment key and a speed adjustment key, said instruction input circuit permitting input of an instruction signal to said controller.

36. The television receiver according to claim 33, further comprising a remote controller having at least a channel up/down key, a volume up/down key, a television/video accompaniment mode selection key, an accompaniment video signal selection key, a numerical keypad for program selection, a start/cancel key, a reserve key, a tone up/down key and a speed up/down key, wherein said remote controller permits input an instruction signal to said controller.

37. The television receiver according to claim 33, wherein said video accompaniment signal generator comprises:

an accompaniment video/character signal generator for generating an accompaniment video signal and a character signal;

an accompaniment signal generator for generating an accompaniment audio signal; and a video accompaniment controller for controlling the operation of said accompaniment video/character signal generator and said accompaniment signal generator.

38. The television receiver according to claim 37, wherein said accompaniment video/character signal generator comprises:

an accompaniment video generator for generating said accompaniment video signal;

a character memory for storing character information; and a character processor for processing the character information read from said character memory.

39. The television receiver according to claim 37, wherein said accompaniment signal generator comprises:

an audio source memory for storing audio information; and an audio source information processor for receiving the audio information read from said audio source memory, and converting the received signal into an accompaniment signal for output.

40. The television receiver according to claim 37, wherein said video accompaniment controller comprises:

a microprocessor for controlling said accompaniment video/character signal generator and said accompaniment signal generator by performing a software program incorporated therein; and an interface circuit for receiving a control instruction which is input from a remote control apparatus, and transmitting the received control instruction to said microprocessor.

41. The television receiver according to claim 37, wherein said video accompaniment signal generator further comprises an external interface circuit for receiving the video/character information and the audio source information supplied from an external source, and supplying the received information to said accompaniment video/character signal generator and said accompaniment signal generator.

* * * * *